J. HEBERLING.
MACHINE FOR REMOVING STONES FROM FRUIT.
APPLICATION FILED NOV. 22, 1909.
1,083,881.
Patented Jan. 6, 1914.
3 SHEETS—SHEET 2.
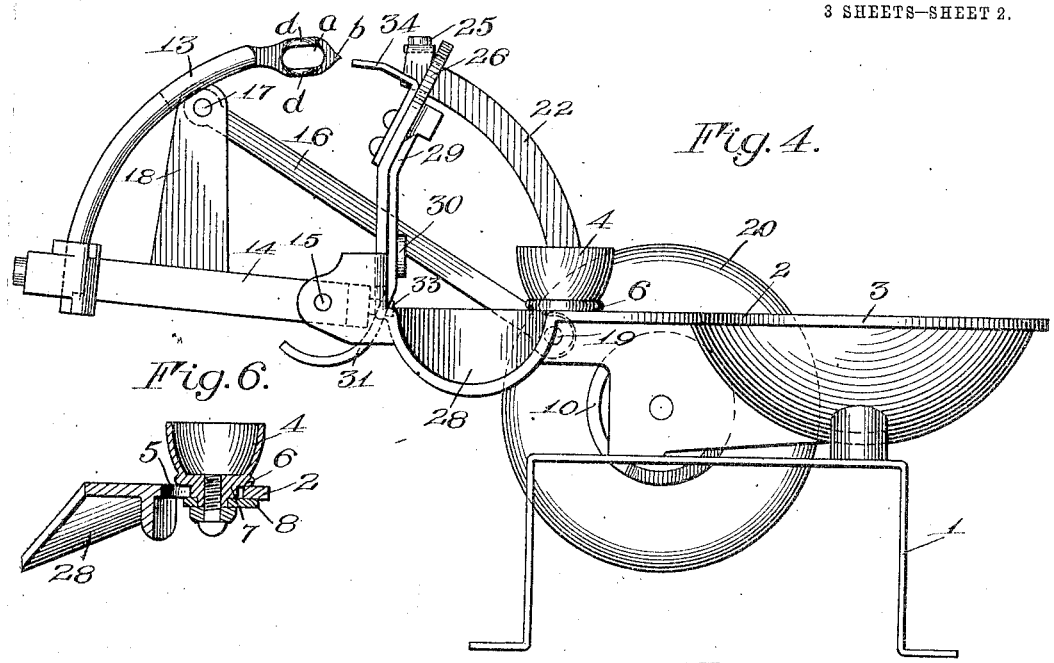
Fig. 4.
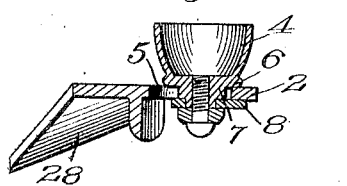
Fig. 6.
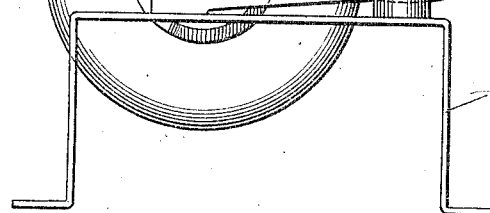
Fig. 5.
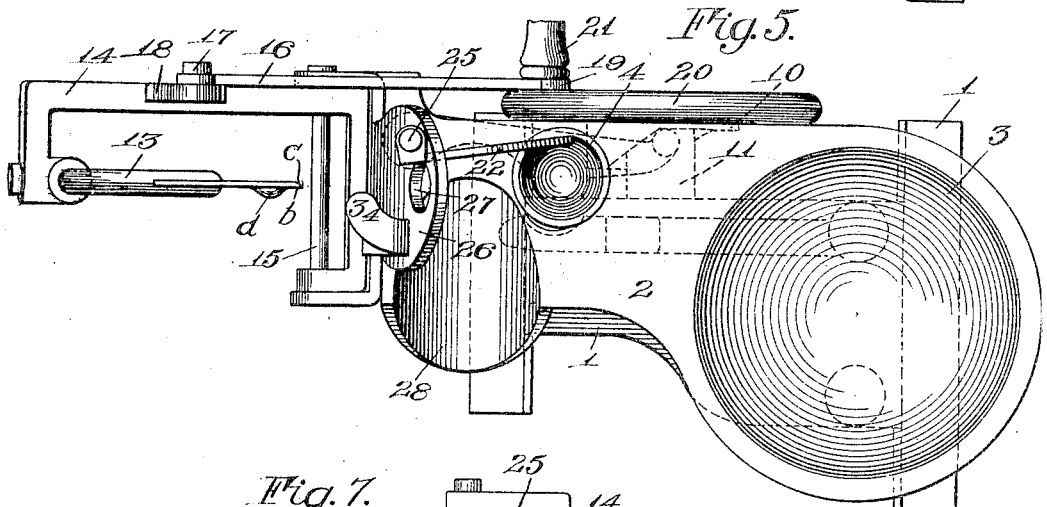
Fig. 7.
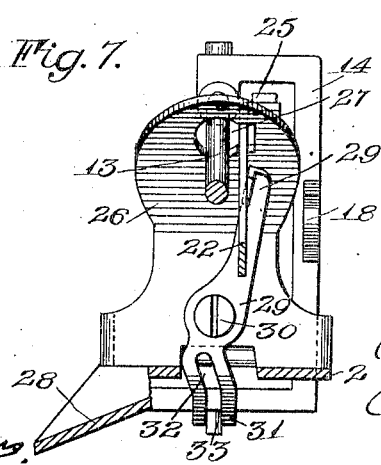
Witnesses
Nelson Copp
H. H. Simms
Inventor
John Heberling
His Attorneys

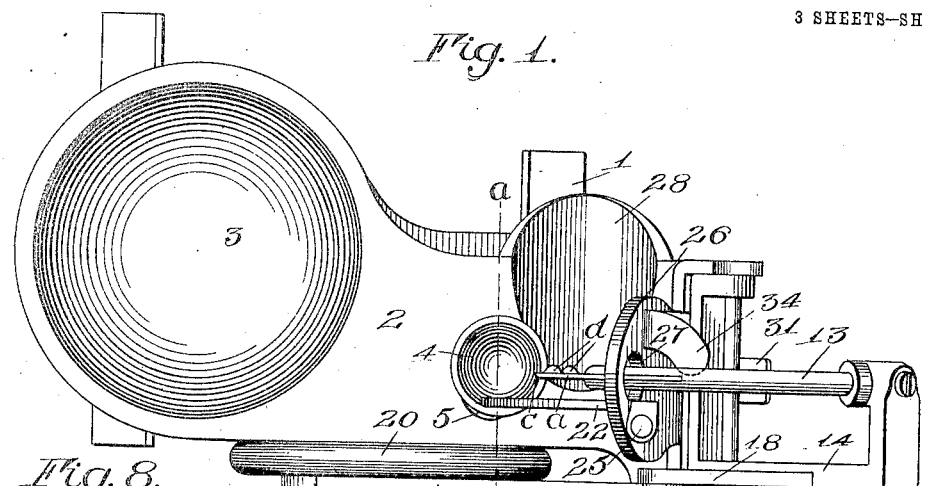
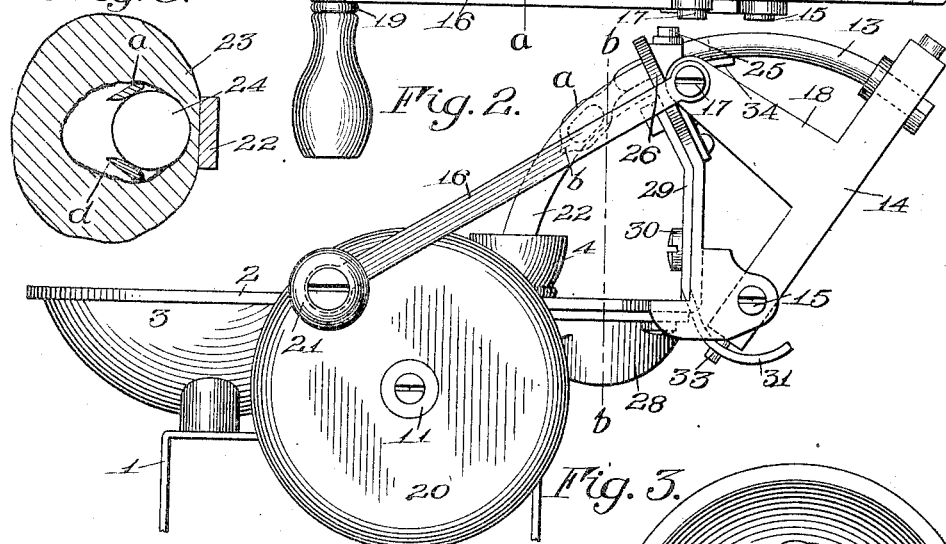
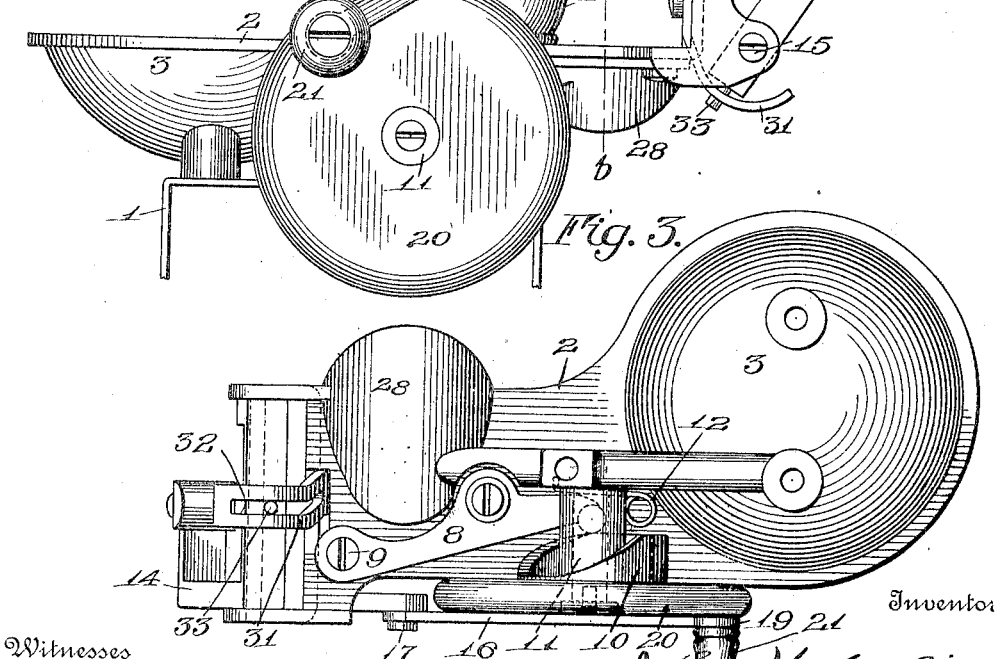

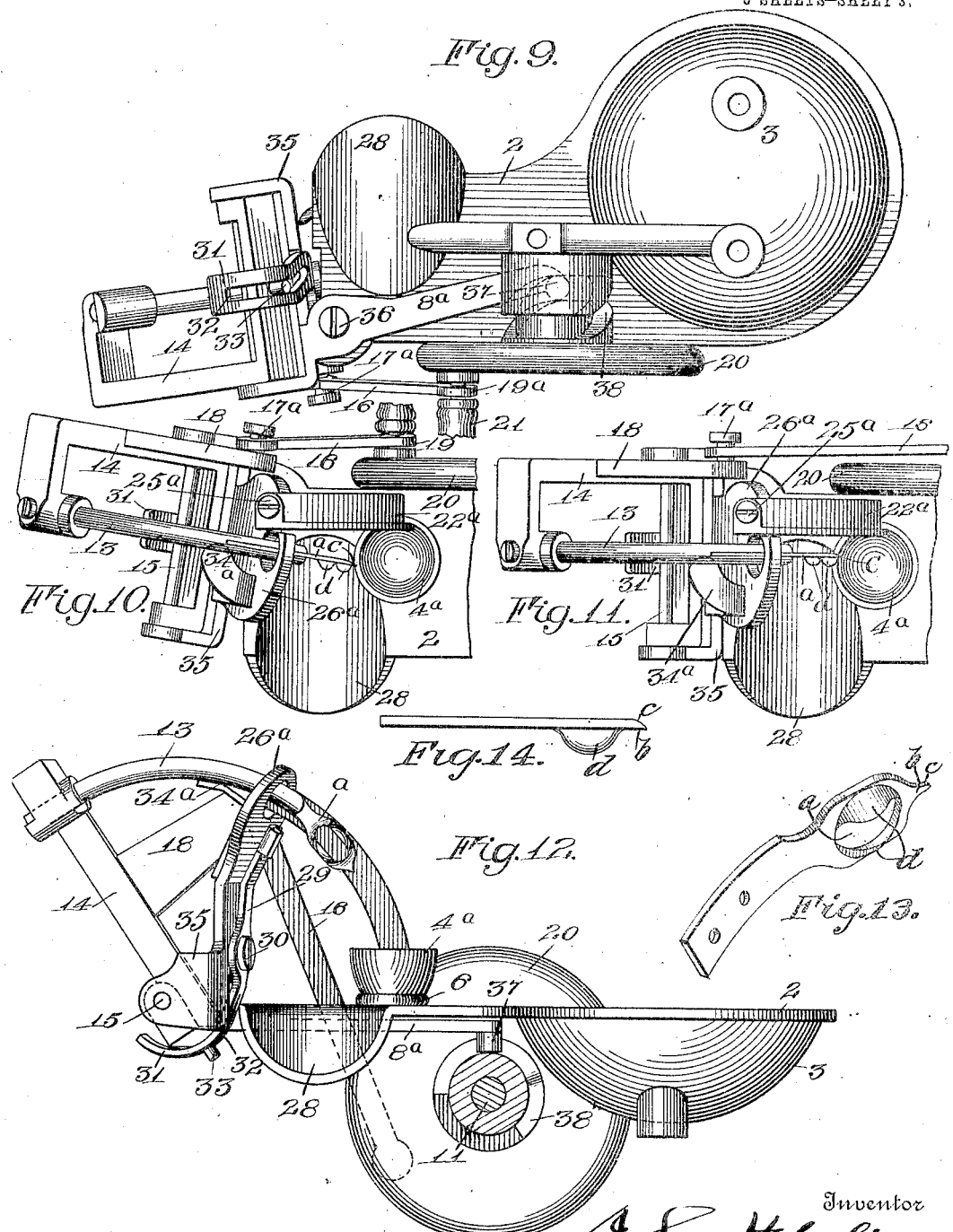

UNITED STATES PATENT OFFICE.

JOHN HEBERLING, OF ROCHESTER, NEW YORK.

MACHINE FOR REMOVING STONES FROM FRUIT.

1,083,881.   Specification of Letters Patent.   Patented Jan. 6, 1914.

Application filed November 22, 1909. Serial No. 529,327.

*To all whom it may concern:*

Be it known that I, JOHN HEBERLING, of Rochester, in the county of Monroe and State of New York, have invented certain new and useful Improvements in Machines for Removing Stones from Fruit; and I do hereby declare the following to be a full, clear, and exact description of the same, reference being had to the accompanying drawings, forming a part of this specification, and to the reference-numerals marked thereon.

The present invention relates to machines for removing stones or seeds from fruit, such for instance as cherries and olives, and it has for an object to provide a machine adapted to remove the stones or seeds through the perforation or opening produced by the tool in entering the fruit so that the latter is but slightly changed from its whole or original condition.

Another object of the invention is to provide a tool or instrument which will engage the stone in such a manner as to insure its being withdrawn from the fruit with the instrument.

To these and other ends the invention consists in certain improvements and combinations of parts all as will be hereinafter more fully described, the novel features being pointed out in the claims at the end of the specification.

In the drawings: Figure 1 is a plan view of one embodiment of the invention; Fig. 2 is a side view of the same embodiment; Fig. 3 is a bottom view with the standard or base removed; Fig. 4 is a side view opposite to that side shown in Fig. 2; Fig. 5 is a top view showing the parts shifted to positions different from those shown in Fig. 1; Fig. 6 is a section on the line *a—a* of Fig. 1; Fig. 7 is a section on the line *b—b* of Fig. 2; Fig. 8 is a detail enlarged view showing the manner in which a stone is removed from a fruit; Fig. 9 is a bottom view of another embodiment of the invention, the base or standard being removed; Figs. 10 and 11 are detail top views of the latter embodiment showing the parts in two different positions; Fig. 12 is a side view, partly in section, of the embodiment shown in Figs. 9 to 11. Fig. 13 is a detail view in perspective of the pitting instrument, and Fig. 14 is a side elevation of the same.

One of the important features of this invention is the tool or instrument which removes the stone. This instrument is capable of use as a hand tool and comprises preferably a hook member in the form of a loop or eye *a*, and a pointed portion *b* at one end of the loop adapting the latter to enter the fruit, the extreme end of the pointed portion having a portion or face *c* inclined to the plane of the loop in order that the instrument when it enters the fruit and engages the stone will be deflected to one side of the latter. After the instrument passes into the fruit a certain depth either the fruit or the instrument may be shifted laterally to cause the hook to pass beneath the stone and the latter to enter the eye *a*. It is preferred to limit the passage of the stone through the loop and for this reason the latter is provided on opposite sides thereof with stops *d* extending outwardly and toward each other from the plane of the loop so that the distance between their outer ends is less than that between the sides or arms of the loop. With this arrangement any meat of the fruit which lies between the instrument and the stone during the introduction of said instrument into the fruit will pass entirely through the loop, but the stone will be held from passage entirely therethrough so that upon the withdrawal of the instrument in a line substantially parallel with the line of introduction will cause the stone to be removed with the instrument without any great injury to the fruit. By providing the stops on opposite sides of the eye and away from that side in proximity to the penetrating portion *b* the said side is free to firmly engage the under side of the stone without any danger of slipping during the withdrawal.

It is preferred to operate the instrument by machinery as it is then possible to introduce the said instrument into a fruit a definite distance and position each time, and injury to the hand of an operator is prevented. Of course, it is possible to remove the stones of a great many more fruits in a given time by a machine than when the instrument is used as a hand tool. It is desirable in a machine employing this instrument, or an instrument operating on its principle, that it should be able to effect a relative lateral or transverse movement of the instrument and the fruit support after the fruit has been penetrated by the instrument. In the embodiment shown in Figs. 1 to 7 the support for the fruit is moved relatively to the instrument after the latter has penetrated the fruit, while in the embodiment shown in Figs. 9 to 12 the tool is moved relatively to the fruit support after the penetration of the fruit. In both embodiments the penetration of the fruit is effected by moving the instrument toward the fruit support but, of course, the invention is not to be limited to such a movement to effect the penetration as any relative movement between these two parts for effecting this result may be employed. It will also be apparent that both embodiments have novel features of construction which are capable of being employed in other types of machines for removing stones from fruit.

Referring now more particularly to the embodiment shown in Figs. 1 to 7, 1 indicates a base piece or stand for the frame 2 which may be formed of a casting having a depression or receptacle 3 therein for the reception of the fruit prior to the removal of the stones. This frame carries the fruit support 4 which preferably is cup shaped in order to center the fruit and is guided laterally or transversely in an arcuate slot 5 formed in the frame 2, the support having a flanged portion 6 working on top of the frame 2 and a portion 7 depending through the slot 5 to the under side of the frame. The movement of this support may be effected by a means comprising a swinging lever 8 pivoted at 9 to the under surface of the frame 2, rigidly secured to the portion 7 of the cupped support depending through the slot 5 and operated in any suitable manner as by a cam 10 formed on the drive shaft 11 journaled on the frame 2, the cam effecting the movement of the lever in one direction, while a spring 12 holds the lever against the cam and effects a movement of said lever in the other direction. The instrument for removing the stone is preferably mounted to reciprocate toward and from the cup. In this instance it is mounted on the curved arm 13 carried by an oscillatory support 14 which turns about an axis 15 that is the center of the curved arm 13 so that the stone removing instrument enters the fruit on the support 4 substantially in a straight line and moves away from the support, carrying the fruit therewith out of vertical alinement with the fruit support. The movement of the fruit removing instrument may be effected in any suitable manner, a simple and inexpensive arrangement consisting of a link or pitman 16 pivoted at one end at 17 to an offset arm 18 on the oscillatory support 14 and pivoted at its other end at 19 to the crank member or disk 20 on the drive shaft 11, the crank disk serving as a fly wheel and having an operating handle 21 screwed thereto. The relation between the driving mechanism of the instrument and the driving mechanism of the cupped support is such that immediately after the stone removing instrument enters the cupped support the latter is shifted transversely to the line of movement of the instrument and is held in this position during the greater portion of the movement of the tool away from the support, a return lateral movement of the cupped support taking place near the last part of the movement of the instrument away from the cupped support. The crank and the pitman are so connected to the oscillatory frame that the dead center, at which the greatest dwell occurs, is reached during the relative lateral movement of the support and the instrument in order to allow sufficient time for the instrument to engage the stone. To the end that the fruit will not move on the stone removing instrument until it is removed therefrom there is provided a retaining device or guide 22 which leads from the cupped support 4 to the discharging position of the fruit. This device coöperates with the exterior of the fruit as shown in Fig. 8, the fruit being indicated by the numeral 23 and its stone by the numeral 24. Of course, in this embodiment the device should swing with the support and for this reason it is pivoted at 25 about an axis coincident with the turning axis 9 of the lever 8. The movement of the stone removing instrument in a curved path carries said tool out of vertical alinement with the cupped support and it is therefore possible to displace the fruit from the instrument without causing said fruit to drop again into the cupped support. This displacement may be effected by a device preferably in the form of an abutment 26 projecting upwardly from the frame 2 and having a perforation 27 through which the instrument and its curved arm 13 pass. Of course, when the fruit, after traveling in contact with the retaining device 22, reaches the abutment 26, the latter will withdraw the fruit from the instrument and permit the said instrument to retain the stone 24 owing to the fact that the instrument is hooked into engagement with said stone. The fruit will in most cases drop from the abutment to any suitable receptacle, a chute 28 being formed on the frame 2, if desirable, for deflecting to one side of the frame. In some instances, however, I have found that the fruit will wedge in the perforation 27 and to maintain said perforation clear there may be provided a device preferably in the form of a tapper 29 pivoted at 30 to the upright abutment 26 and having a curved extension 31 concentric with the pivot 15 of the oscillatory frame provided with a cam slot 32 in which works a pin 33 on the oscillatory frame to effect the movement of the tapper in order to clear the opening as the stone removing instrument passes rearwardly from the upright or abutment 26 so that on the return movement of the instrument the fruit will have been positively displaced from its path. After the abutment 26 is passed the seed within the instrument may be engaged by a device preferably an abutment 34 secured to the rear side of the abutment 26 and adapted to travel between the stops $d$ on the instrument to force the seed from that side of the eye or loop through which it was introduced. The operation of this embodiment of the invention will be clear from the foregoing description, but it may be generally stated that rotation of the shaft 11 by means of a handle 21 effects the movement of the instrument toward the cupped support 4 from the positions shown in Figs. 4 and 5, the fruit having previously been deposited in the cup by hand or otherwise. As the instrument enters the cupped support the latter is shifted transversely or laterally to the line of movement of the instrument, thus causing the fruit to be forced against one side of the cupped support and the stone to enter the eye $a$. The instrument is now withdrawn from the support and carries the fruit therewith in contact with the retaining guide 22 unitl the abutment 26 is reached, when the meat of the fruit is stripped from the instrument by the abutment 26 and drops into the chute 28. The instrument passes rearwardly from the abutment and the seed therein is engaged by the abutment 34 and is displaced therefrom. The machine now starts upon a new operation.

In the embodiment of the invention shown in Figs. 9 to 12 the standard or base piece 1 has been removed from the frame 2 which, as in the first embodiment, is provided with a chute 28, a receptacle or chamber 3 and a drive shaft 11. The fruit is deposited in the cupped support $4^a$ which is rigidly secured to the frame 1, while the instrument, which may be the same as that described in the first embodiment, moves laterally after entering the cupped support. The instrument is preferably carried by a curved arm 13 arranged on the oscillatory support 14 that turns about an axis 15 which is the center of the curve of the arm 13, the oscillation of the support 14 being effected by a pitman 16 having a loose connection at $17^a$ with the support and a loose connection at $19^a$ with the crank member 20 on the shaft 11, the crank member, being operated as in the first embodiment, by a handle 21. To the end that the instrument may be given a lateral movement after entering the cup, the support 14 of said tool is pivoted on the swinging frame 35 which in turn is pivoted at 36 to the under surface of the frame 2 and has an arm $8^a$ whose free end 37 coöperates with the cam 38 arranged on the shaft 11. This cam is so formed that the instrument moves toward the fruit in the cupped support $4^a$ so as to strike such fruit at one side of the center, as will be seen by referring to Fig. 10. After the fruit is engaged the cam shifts the instrument laterally or transversely to the line of its movement toward the fruit, causing the stone to enter the eye and the parts to assume the positions shown in Fig. 11. To coöperate with the fruit during its travel from the receptacle $4^a$, the retaining guide $22^a$ is provided and is rigid with the support but has pivotal connection at $25^a$ with the swinging frame 35. The latter also carries the abutment $26^a$ which coöperates with the fruit to remove the latter from the tool $a$, the abutment $34^a$ being arranged upon the rear face of the standard $26^a$ so as to swing with the tool and displace the seed from the latter. The tapper 29 is also pivotally mounted on the swinging frame 35 at 30 and has the curved arm 31 with a cam slot 32 in which works the pin 33 on the oscillatory frame 14. In the operation of this embodiment, the fruit is deposited by hand or otherwise in the cup $4^a$ and the handle 21 is turned to cause the instrument to move toward the cup with the parts in the position shown in Fig. 10. After the fruit is engaged the instrument is shifted laterally and the parts assume substantially the positions shown in Fig. 11. Upon the return movement of the tool the fruit travels in engagement with the device $22^a$ until the abutment $26^a$ is reached, when the fruit is stripped from the instrument by the abutment $26^a$ and then the abutment $34^a$ displaces the seed from the eye of the instrument. After this is accomplished the cam again shifts the tool laterally for its return movement.

As before stated the stone removing tool or instrument is capable of manual operation or may be operated by machinery of any suitable type. The machines herein illustrated are especially designed for household purposes and effectively remove the seeds from the fruit without material injury to the same, permitting the fruit to have substantially its original appearance, a result which is much desired and has only been accomplished heretofore by hand, and then only with great waste as it has been impossible to properly remove the stones from every fruit operated upon. This machine makes it possible to properly remove the stone from every fruit for which the machine is adapted as the fruit is properly centered with reference to the instrument and the latter penetrates the fruit a definite distance at every operation.

I claim as my invention:

1. An instrument for removing stones or seeds from fruit comprising a loop adapted to receive the stone through one side thereof and a pointed portion permitting the looped portion to enter the fruit, said pointed portion having a portion inclined to the plane of the loop in such a direction that the instrument will be deflected to one side of the stone to receive the latter through the receiving side of the loop.

2. An instrument for removing stones or seeds from fruit comprising an eye-shaped hook adapted to receive the stone through one side thereof, said hook being provided with separated projections on opposite sides of the eye for coöperation with the stone to prevent the passage of the latter through the eye but permit the passage of the meat of the fruit between them.

3. An instrument for removing stones or seeds from fruit comprising a penetrating portion having an inclined face on one side, a loop in the rear of the penetrating portion for receiving the stone, and a stop for preventing the discharge of the stone through the loop and extending from the side of the loop opposite to said inclined face.

4. An instrument for removing stones or seeds from fruit comprising a penetrating portion having an inclined face on one side thereof, a loop in the rear of the penetrating portion for receiving the stones, and separate projections extending from the sides of the loop and in a direction opposite to said inclined face.

5. An instrument for removing stones or seeds from fruit comprising a loop adapted to receive the stone of the fruit, through one side thereof, and a pair of projections extending from one side of the plane of the loop and from opposite sides or arms of the latter.

6. In a machine for removing stones or seeds from fruit, the combination with a stone removing instrument adapted to penetrate the fruit, of means for effecting a relative movement of the instrument and the fruit laterally to the line of penetration to cause the stone to be engaged by the instrument, and means for separating the fruit and the instrument after the lateral movement to cause the stone to be withdrawn from the fruit.

7. In a machine for removing stones or seeds from fruit, the combination with a stone removing instrument adapted to penetrate the fruit, of means for effecting a relative movement of the instrument and the fruit laterally to the line of penetration to cause the stone to be engaged by the instrument, means for separating the fruit and the instrument after the lateral movement to cause the stone to be withdrawn from the fruit, and a device for displacing the stone from the stone removing instrument.

8. In a machine for removing stones or seeds from fruit, the combination with a stone removing instrument and a support for receiving the fruit, one of which is adapted to move toward the other to cause the instrument to penetrate the fruit, of means for effecting a relative movement of the support and the instrument laterally to the line of penetration to cause the latter to engage the stone of the fruit, and means coöperating with the fruit to cause the instrument and the stone to be removed from the fruit.

9. In a machine for removing stones or seeds from fruit, the combination with a cupped support adapted to center a fruit therein, and a stone removing member having a loop, of means for effecting a relative movement of the support and the member to cause the latter to penetrate the fruit in the cupped support, means for effecting a relative lateral movement of the support and the member to cause the latter to engage the stone, and means engaging the fruit to cause the stone to be withdrawn therefrom.

10. In a machine for removing stones or seeds from fruit, the combination with a fruit support and a stone removing instrument having relative movement, one toward the other, to cause the instrument to penetrate the fruit and relative movement one away from the other, of means for effecting a relative movement between said parts laterally to the line of penetration when the instrument is engaging the fruit to cause the instrument to engage the stone of the fruit, and means for engaging the fruit during the separation of the support and the instrument to cause the latter to withdraw the stone from the fruit.

11. In a machine for removing stones or seeds from fruit, the combination with a fruit support and a stone removing instrument, the latter being movable toward and from the support, of means for effecting a relative lateral movement of the support and the instrument laterally to the line of penetration while the instrument engages the fruit to cause the instrument to engage the stone, and a device engaging the fruit during the movement of the instrument away from the support to cause the instrument to withdraw the stone from the fruit.

12. In a machine for removing stones or seeds from fruit, the combination with an instrument having a loop and adapted to enter the fruit to withdraw the stone therefrom, of a support for the fruit, and means for effecting the movement of one of said parts toward and thence from the other to cause the instrument to pass into but not through the fruit, engaging the stone and then removing the latter through the opening made in entering the fruit.

13. In a machine for removing stones or seeds from fruit, the combination with a hooked instrument adapted to enter the fruit, of a support for the fruit, means for effecting the movement of one of said parts toward the other, and means for effecting the movement of one of said parts relatively to the other in a direction transverse to the line of penetration and while the fruit is engaged by the instrument to cause the hooked instrument to pass beneath the stone in the fruit.

14. In a machine for removing stones or seeds from fruit, the combination with a stone removing instrument, of a device coöperating with the exterior of the fruit to effect a lateral movement of the latter on the instrument laterally to the line of penetration, and a device for removing the fruit from the instrument after the lateral movement to cause the instrument to withdraw the stone.

15. In a machine for removing stones or seeds from fruit, the combination with a support for the fruit, and a stone removing instrument, one of said parts being movable toward and from the other to cause the stone removing instrument to penetrate the fruit and remove the same from the support, of a retaining device along which the fruit is carried by the stone removing instrument, arranged to engage the exterior of the fruit after the latter is removed from the support, and means for removing the fruit from the instrument while said fruit is engaged by the retaining device.

16. In a machine for removing stones or seeds from fruit, the combination with a stone removing instrument adapted to penetrate the fruit, and a support for the fruit during such penetration, one of said parts being movable transversely to cause the instrument to engage the stone, of a retaining device coöperating with the exterior of the fruit to maintain the latter against lateral movement relative to the tool until the seed is withdrawn.

17. In a machine for removing stones or seeds from fruit, the combination with a stone removing instrument adapted to penetrate the fruit and a support for the fruit during such penetration, said parts having relative movement to permit penetration and relative lateral movement to permit the instrument to engage the stone of the fruit, of a retaining device with which the fruit engages during the separation of the support and the instrument in order to prevent lateral movement of the fruit on the instrument, and means for displacing the fruit from the instrument while the latter engages the retaining device to cause the instrument to retain the stone.

18. In a machine for removing stones or seeds from fruit, the combination with a stone removing instrument adapted to penetrate the fruit, of a support for the fruit during such penetration, one of said parts being shiftable transverse to the line of penetration, in order that the stone removing instrument may pass into engagement with the stone, a device coöperating with the fruit after the latter is removed from the support to prevent the fruit shifting laterally during the removal of the stone, and an abutment arranged to coöperate with fruit to remove the same from the stone removing instrument.

19. In a machine for removing stones or seeds from fruit, the combination with a fruit support, of a stone removing instrument adapted to penetrate the fruit and carry the latter from the support, means for effecting a relative movement of the support and the stone removing instrument transverse of the line of the penetrating movement and during the penetration to cause the stone removing instrument to engage the stone, a retaining device leading from the support and engaging the fruit during the travel of the latter from the support, and displacing means arranged to engage the fruit near the opposite end of the retaining device.

20. In a machine for removing stones or seeds from fruit, the combination with a support, of a retaining device leading therefrom, an abutment near the opposite end of the retaining device, a stone removing instrument adapted to penetrate the fruit on the support and carry the said fruit in engagement with the retaining device to the abutment, and means for effecting a relative transverse movement between the support and the stone removing instrument during the penetration to cause the stone removing instrument to engage the stone.

21. In a machine for removing stones or seeds from fruit, the combination with a cupped support for the fruit, of a retaining device leading therefrom, displacing means to which the fruit is carried on the retaining device, a hooked stone removing instrument adapted to penetrate the fruit in the cupped support and carry said fruit to the displacing means and on said retaining device, and means for effecting a relative transverse movement of the support and the stone removing instrument during the penetration to cause the stone removing means to engage the stone.

22. In a machine for removing stones or seeds from fruit, the combination with a support for the fruit, of a stone removing instrument adapted to penetrate the fruit and having a loop to receive the stone, and means for effecting a relative transverse movement between the support and the stone removing instrument to cause the stone to enter the loop.

23. In a machine for removing stones or seeds from fruit, the combination with a support for the fruit, of a stone removing instrument adapted to penetrate the fruit and having a loop to receive the stone, means for effecting a relative transverse movement between the support and the stone removing instrument to cause the stone to enter the loop, and an abutment to coöperate with the stone after the separation of the support and the instrument to remove the stone from the loop.

24. In a machine for removing stones or seeds from fruit, the combination with a support for the fruit, of a stone removing instrument having a loop and movable toward and from the support, out of vertical alinement with the latter to penetrate the fruit and withdraw the stone, and a device located out of vertical alinement with the support for removing the withdrawn stone from the stone removing instrument.

25. In a machine for removing stones or seeds from fruit, the combination with a support for the fruit, of a stone withdrawing instrument, a curved arm by which the latter is supported movable about the center of the curve of the arm, and a device past which the curved arm moves, located out of vertical alinement with the support.

26. A machine for removing stones or seeds from fruit comprising a support, a stone removing instrument, a curved supporting arm for the instrument mounted to turn about the center of the curve of the arm to carry the stone removing instrument to and from the support, mechanism for effecting a relative lateral or transverse movement of the support and the stone removing instrument when the latter reaches the support, and means for removing the fruit from the stone removing instrument.

27. A machine for removing stones or seeds from fruit comprising a support, a stone removing instrument, a curved supporting arm for the instrument mounted to turn about the center of the curve of the arm to carry the stone removing instrument to and from the support, mechanism for effecting a relative lateral or transverse movement of the support and the stone removing instrument when the latter reaches the support, an abutment for removing the fruit from the stone removing instrument, and a retaining device leading from the support to the abutment to coöperate with the fruit during the movement of the latter from the support to the abutment to prevent the lateral movement of the fruit on the stone removing instrument.

28. A machine for removing stones or seeds from fruit comprising a support, a stone removing instrument, a curved supporting arm for the instrument mounted to turn about the center of the curve of the arm to carry the stone removing instrument to and from the support, mechanism for effecting a relative lateral or transverse movement of the support and the stone removing instrument when the latter reaches the support, an abutment for removing the fruit from the stone removing instrument, a retaining device leading from the support to the abutment to coöperate with the fruit during the movement of the latter from the support to the abutment, and an abutment arranged in rear of the abutment to remove the stone from the instrument.

29. In a machine for removing stones or seeds from fruit, the combination with a support for the fruit, of a stone removing instrument movable toward and from the support to penetrate the fruit on the support, an abutment located to remove the fruit from the stone removing instrument, and a device movable in a plane parallel to the abutment and adapted to displace the fruit therefrom.

30. In a machine for removing stones or seeds from fruit, the combination with a support for the fruit, of a stone removing instrument movable toward and from the support out of vertical alinement with the latter, a perforated abutment located out of vertical alinement with the support and having the stone removing instrument passing therethrough, and a device movable in a plane parallel to the abutment and adapted to displace the fruit therefrom.

31. A machine for removing stones or seeds from fruit comprising a support, a stone removing instrument, a curved supporting arm for the instrument mounted to turn about the center of the curve of the arm to carry the stone removing instrument to and from the support, mechanism for effecting a relative lateral or transverse movement between the support and the stone removing instrument when the latter reaches the support, an abutment to strip the fruit from the stone removing instrument, a retaining device leading from the support to the abutment to coöperate with the fruit during the movement of the latter from the support to the abutment, and a device arranged to operate in front of the perforated abutment to clear the latter of the fruit after each operation.

32. In a machine for removing stones or seeds from fruit, the combination with a stone removing instrument, and a support, the instrument being movable toward and from the support and the latter being movable transversely to cause the instrument to engage the stone of a fruit on the support, of mechanism for effecting the transverse movement of the support while the instrument is engaging a fruit on the support.

33. A machine for removing stones or seeds from fruit comprising a transversely movable support, a stone removing instrument, a curved supporting arm for the instrument mounted to turn about the center of the curve of the arm to carry the stone removing instrument to and from the support, and mechanism for effecting the lateral movement of the support when the stone removing instrument reaches it to cause the stone of the fruit to be engaged by the instrument.

34. A machine for removing stones or seeds from fruit comprising a transversely movable support, a stone removing instrument, a curved supporting arm for the instrument mounted to turn about the center of the curve of the arm to carry the stone removing instrument to and from the support, mechanism for effecting the lateral movement of the support when the stone removing instrument reaches it to cause the stone of the fruit to be engaged by the instrument, and an abutment arranged out of vertical alinement with the support and adapted to strip the fruit from the stone removing instrument.

35. A machine for removing stones or seeds from fruit comprising a transversely movable support, a stone removing instrument, a curved supporting arm for the instrument mounted to turn about the center of the curve of the arm to carry the stone removing instrument to and from the support, mechanism for effecting the lateral movement of the support when the stone removing instrument reaches it to cause the stone of the fruit to be engaged by the instrument, an abutment located out of vertical alinement with the support and adapted to strip the fruit from the stone removing instrument, and a retaining device leading from the support to the abutment and pivotally connected to the latter.

36. A machine for removing stones or seeds from fruit comprising a transversely movable support, a stone removing instrument, a curved supporting arm for the instrument mounted to turn about the center of the curve of the arm to carry the stone removing instrument to and from the support, mechanism for effecting a lateral movement of the support when the stone removing instrument reaches it to cause the stone of the fruit to be engaged by the instrument, an abutment located out of vertical alinement with the support and adapted to strip the fruit from the stone removing instrument, a retaining device leading from the cupped support to the abutment and pivotally connected to the latter, an abutment arranged in rear of the perforated abutment to remove the stone from the instrument, and a device arranged in front of the perforated abutment to clear the latter of the fruit after each operation.

37. In a machine for removing stones or seeds from fruit, the combination with a support for the fruit and a reciprocatory frame, one of which is mounted for lateral movement, of a stone removing instrument carried by the frame, means for effecting a lateral movement of the laterally movable part when the instrument is in proximity to the support, and mechanism for reciprocating the frame providing a dwell in the movement of the instrument when the latter is in proximity to the support.

38. In a machine for removing stones or seeds from fruit, the combination with a support for the fruit and a reciprocatory frame, one of which is mounted for lateral movement, of a stone removing instrument carried by the frame, means for effecting the lateral movement of the laterally movable part when the instrument is in proximity to the support, and mechanism for reciprocating the frame comprising a crank member and a pitman, one of the dead points of the crank mechanism being so located that it is reached during the lateral movement of the movable part in order that a dwell is produced in the movement of the stone removing instrument.

39. In a machine for removing stones or seeds from fruit, the combination with a support for the fruit, and a reciprocating frame, one of which is mounted for lateral movement, of a drive shaft, a cam on the shaft for operating the laterally movable part, a stone removing tool carried by the reciprocatory frame, a crank member on the drive shaft, and a link connecting the crank member with the reciprocatory frame.

40. In a machine for removing stones or seeds from fruit, the combination with a support for the fruit and an oscillatory frame, of a stone removing instrument carried by the frame, an abutment past which the stone removing instrument is carried by the oscillatory frame, a pivotally mounted member arranged to displace the fruit from the path of the instrument and provided with a cam slot, and a projection on the oscillatory frame adapted to operate in the cam slot.

41. In a machine for removing stones or seeds from fruit, the combination with a support for the fruit, and an oscillatory frame, of a stone removing instrument carried by the frame, an abutment through which the instrument operates in its movement toward and from the support, and a pivotally mounted member operating in front of the abutment to clear the latter of the fruit, said pivotally mounted member having a curved portion concentric with the turning axis of the oscillatory frame and coöperating with a portion of said frame in order that its pivotal movement may be effected.

42. A machine for removing stones or seeds from fruit comprising a drive shaft, an oscillatory frame, a curved arm carried by the frame and having the center of its curve located at the pivot of the oscillatory frame, a stone removing instrument carried by the free end of the curved arm, a crank member on the driving shaft, a link connecting the crank member and the oscillatory frame, a fruit support mounted to swing transversely of the line of movement of the stone removing instrument to cause the latter to engage a stone in the fruit on the support, and a cam on the drive shaft engaging the swinging support.

43. A machine for removing stones or seeds from fruit comprising a transversely movable support, a drive shaft having a cam thereon coöperating with the support, an oscillatory frame, a link connecting the oscillatory frame with the drive shaft, a curved arm carried by the oscillatory frame and having the center of its curve located at the pivot of the frame, a stone removing instrument carried by the free end of the curved arm, a perforated abutment through which the curved arm passes, located out of vertical alinement with the support, a retaining device secured to the support and pivotally connected to the abutment, a member pivotally mounted on the front of the abutment to displace the fruit therefrom and having a cam slot therein, a projection on the oscillatory frame operating in the cam slot to move the said member, and an abutment arranged in rear of the perforated abutment and adapted to remove the stone from the stone removing member.

44. The combination with a stone removing instrument having a loop and stop portions arranged at opposite sides of the loop, of a stone ejector, one of said parts being movable relatively to the other to cause the ejector to pass between the stop portions.

45. The combination with a stone removing instrument having a loop, and a fruit displacing device, one of which is movable relatively to the other to displace the fruit from the stone removing instrument, of a stone ejector adapted to displace the stone from the loop after the displacement of the fruit.

46. The combination with a stone removing instrument having a loop, and a fruit displacing device, one of which is movable relatively to the other, of a stone ejector fixed relatively to the fruit ejector and arranged to displace the stone from the loop after the fruit has been displaced from the instrument.

JOHN HEBERLING.

Witnesses:
 JOHN C. BAUMER,
 G. WILLARD RICH.